United States Patent [19]

Barie, Jr.

[11] 4,097,456

[45] Jun. 27, 1978

[54] PREPARATION OF ACETYLENE-SUBSTITUTED POLYIMIDE OLIGOMERS AND POLYIMIDE POLYMERS

[75] Inventor: Walter P. Barie, Jr., Shaler Township, Allegheny County, Pa.

[73] Assignee: Gulf Research & Development Company, Pittsburgh, Pa.

[21] Appl. No.: 782,001

[22] Filed: Mar. 28, 1977

[51] Int. Cl.$^2$ ............................................. C08G 73/12
[52] U.S. Cl. ........................... 260/47 UA; 260/47 CP; 260/49; 260/63 R; 260/65; 260/78 UA; 260/78 TF; 260/326 N; 428/474
[58] Field of Search ........ 260/47 CP, 78 UA, 47 UA, 260/78 TF, 63 R, 65, 49, 326 N; 428/47 A

[56] References Cited

U.S. PATENT DOCUMENTS

| | | | |
|---|---|---|---|
| 3,845,018 | 10/1974 | Bilow et al. | 260/47 CP |
| 3,879,349 | 4/1975 | Bilow et al. | 260/47 UA |
| 3,897,395 | 7/1975 | D'Alelio | 260/63 N |
| 3,998,786 | 12/1976 | D'Alelio | 260/47 CP |

*Primary Examiner*—Lester L. Lee

[57] ABSTRACT

An improved method is described for the preparation of certain acetylene-substituted polyimide oligomers which are substantially free of reaction solvent and thus do not fracture at use temperatures above 600° F. (316° C.). The acetylene-substituted polyimide oligomers are prepared by reacting an aromatic tetracarboxylic acid dianhydride such as benzophenone tetracarboxylic acid dianhydride with an aromatic diamino compound such as a diamino polyarylene ether in the presence of N-methyl-2-pyrrolidone (NMP) as a solvent to form a first reaction product which is in turn reacted with an aminoarylacetylene to form a solution of an acetylene-substituted polyamic acid oligomer in NMP. The polyamic acid oligomer is thereafter converted to the desired acetylene-terminated polyimide oligomer by heating in the continued presence of said N-methyl-2-pyrrolidone. The N-methyl-2-pyrrolidone can then be removed by any suitable means such as by precipitation of the acetylene-substituted polyimide oligomer in a non-solvent such as ethanol.

22 Claims, No Drawings

PREPARATION OF ACETYLENE-SUBSTITUTED POLYIMIDE OLIGOMERS AND POLYIMIDE POLYMERS

BACKGROUND OF THE INVENTION

The prior art, notably U.S. Pat. Nos. 3,845,018 to N. Bilow et al, and 3,879,349, also to N. Bilow et al, disclose certain acetylene-substituted polyimide oligomers and describe methods for their preparation.

The polyimide oligomers are very useful as molding powders, coatings on wires or other substances, as adhesives, or as laminating resins. The final product as taught in the U.S. Pat. No. 3,845,018, patent, column 1, lines 50 et seq., has a very low void content as well as excellent thermal and physical properties. A method of homopolymerizing the acetylene-substituted polyimide oligomers described in the U.S. Pat. No. 3,845,018 can be found in the teachings of the 3,879,349 patent referred to above.

The method of preparation of the acetylene-substituted polyimide oligomers is described in the U.S. Pat. No. 3,845,018 and is a multi-step procedure involving the initial reaction of an aromatic tetracarboxylic acid dianhydride such as benzophenone tetracarboxylic acid dianhydride with an aromatic diamine to form an anhydride-capped polyamic acid, which is subsequently reacted with an aminoarylacetylene to produce an acetylene-terminated polyamic acid oligomer, which is then thermally converted to the desired acetylene-substituted polyimide oligomer. The formation of the polyamic acid and acetylene-terminated oligomer occurs in the presence of a solvent, which in all of the working Examples in the cited art is dimethyl formamide. In accordance with the teachings of the cited prior art, the dimethyl formamide solvent is removed before the conversion of the acetylene-terminated polyamic acid oligomer to the desired polyimide (see Col. 4 of the U.S. Pat. No. 3,845,018 reference, lines 31–33, and the working Examples). The solvent-free polyamic acid oligomer is then diluted with imidization agents such as acetic anhydride or a benzene-cresol mixture.

No reason is given for the removal of the DMF from the polyamic acid oligomer before imidization, but, an "imidization" agent as noted is added, presumably to aid in the removal of the water of imidization and thus drive the reaction to completion. When the imidization agent is benzene-cresol, the benzene is used to azeotrope with water. The function of the cresol is not specified by Bilow et al in their patents. Since the DMF is removed from the acetylene-capped oligomers, the cresol is believed to function as a solvent for the oligomers to aid in the imidization reaction. The acetic anhydride can serve as both a solvent and water removal agent. In any event, the separate removal of DMF before imidization is an added burden on the process, especially since it is removed in a rotary evaporator requiring considerable energy input and time. The process of the present invention avoids the need for the removal of the reaction solvent before imidization and thus simplifies the reaction sequence. Further, the process of the present invention avoids the need for the addition of a reaction solvent such as cresol when a water-azeotroping agent such as benzene is added during imidization.

It has also been found that when the teachings of the cited prior art references with regard to the preparation of the acetylene-substituted polyimide oligomers is followed using dimethyl formamide as the solvent, the resulting cured resin fractures at post-cure temperatures above about 485° F. (252° C). The advantage of the acetylene-substituted polyimide oligomers is that on curing they have very low void contents, giving rise to excellent thermal and physical properties. It has been found that the ability of the finally cured resin to operate at high temperatures (over 485° F. (252° C.)) for extended periods of time is a direct function of the history of the post-cure temperatures to which the resin is subjected. Thus if the finally cured resin is expected to perform well at temperatures in the 500° to 700° F. (260° to 371° C.) range, then post-curing of the resin must also occur at temperatures of about the same range. It has been found that when post-cure temperatures above about 485° F. (252° C.) are employed when DMF is used as the solvent in the preparation of the uncured acetylene-substituted polyimide oligomers, fracturing or blistering of the resin or laminates may occur. The reason for failure was found to be the evolution of dimethyl formamide from the resin at temperatures exceeding 485° F. (252° C.), despite the fact that dimethyl formamide has a boiling point of about 302° F. (150° C.), and thus should have been removed by simple distillation or evaporation earlier in the processing sequence. It is theorized that somehow the DMF solvent is coordinating or reacting with components of the acetylene-substituted polyimide oligomers and is not being removed at the expected conditions as taught in the prior art. Extended drying times cannot be employed, as this tends to prematurely cure the oligomers. Even if it were possible to extend the drying time, the dimethyl formamide may well not be removed since heating at 485° F. (252° C.) indicates no DMF was present in a gas stream being analyzed by a pyrolysis-gas chromatography - mass spectrometry system.

SUMMARY OF THE PRESENT INVENTION

It has now been discovered in accordance with the invention that N-methyl-2-pyrrolidone can be used as the solvent in the formation of the acetylene-substituted polyimide oligomers without the need for removal of the solvent prior to imidization. Further, N-methyl-2-pyrrolidone can conveniently be removed from the reaction product despite its higher boiling point of 392° F. (200° C.) so that cured resins perform well at elevated temperatures even on the order of 500° to 700° F. (288° to 371° C.) without fracturing for extended periods of time.

DETAILED DESCRIPTION OF THE INVENTION

The preparation of an acetylene-substituted polyimide oligomer in accordance with the invention occurs by a multi-step process involving the reaction of a stoichiometric excess of an aromatic tetracarboxylic dianhydride, or a lower alkyl diester thereof, with an aromatic diamine to form an anhydride-capped polyamic acid or the corresponding acid-ester-capped analog in the presence of a sufficient amount of a solvent consisting essentially of N-methyl-2-pyrrolidone to form a solution at elevated temperatures of about 60° to about 170° C; thereafter reacting the anhydride-capped polyamic acid or analog with an aminoarylacetylene, such as aminophenylacetylene, in the continued presence of NMP to produce an acetylene-substituted polyamic acid oligomer. The acetylene-substituted (terminated) polyamic acid oligomer is then converted at elevated temperatures, with or without a catalyst such as sulfuric acid and preferably by simple heating (thermally) to the corresponding polyimide in the continued presence of NMP. If an aromatic tetracarboxylic anhydride was employed in the initial reaction, then water is given off as a byproduct during the formation of the polyimide. On the other hand, if a lower alkyl diester of the aromatic tetracarboxylic acid is employed initially, then, of course, an alcohol corresponding to the lower alkyl group of the diester is evolved during formation of the polyimide. The water or alcohol byproduct is preferably continuously removed during the formation of the polyimide to aid, of course, in driving the reaction to completion. A water-azeotroping agent such as benzene can be added to aid in the removal of the water of imidization. A portion of the NMP could, optionally, be removed before the conversion of the polyamic acid oligomer, but sufficient NMP should remain for ease in handling the oligomer during imidization. The presence of the NMP during the imidization is not deleterious to the process and preferably remains in the reaction product to reduce the number of steps occurring in the formation of the desired acetylene-substituted polyimide oligomers which can thereafter be recovered substantially free of the NMP by methods well known in the art. The recovered neat polyimide oligomers can be used to form molded articles under known conditions of curing. Laminates, for example glass laminates, or composites containing powdered metals or other materials can also be formed by curing at elevated temperatures of up to 485° F. (252° C.).

The precursors to the acetylene-substituted polyimide oligomers made by the process of this invention are known in the art. Preferred forms of the precursors and the polyimide oligomers are described in U.S. Pat. No. 3,845,018 referred to above, issued to Norman Bilow et al on Oct. 29, 1974. Thus the process of this invention is particularly directed to the preparation of an acetylene-substituted polyimide oligomer having the general structure:

Formula I

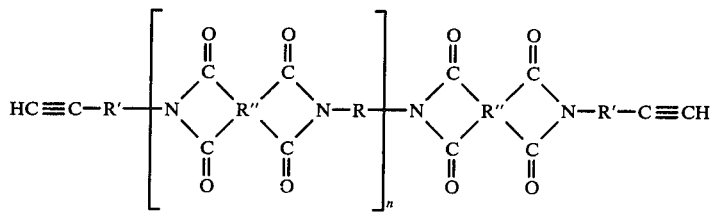

wherein R is poly(arylene ether) or poly(arylene thioether), R' is arylene or diarylene ether, $n$ is an average from 1 to about 10, and R" is

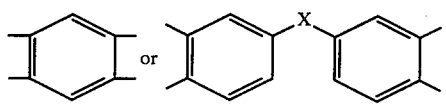

and X is C=O, CH$_2$, O, SO$_2$,

or a bond or acetylene substituted derivatives thereof.

The acetylene-substituted polyimide oligomers are prepared by a series of steps involving the preparation of intermediate "precursors" to the desired polyimide oligomers.

Initially, a stoichiometric excess of an aromatic tetracarboxylic acid dianhydride, or a lower alkyl diester thereof, is reacted with an aromatic diamine to form an anhydridecapped polyamic acid or the corresponding acid - ester-capped analog in the presence of at least a sufficient amount of a solvent consisting essentially of N-methyl-2-pyrrolidone (NMP) to form a solution at elevated temperatures.

Preferably the aromatic tetracarboxylic acid dianhydride has the formula:

Formula II

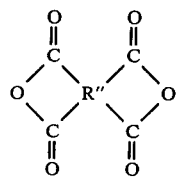

where R" is

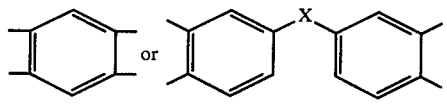

and X is C=O, CH$_2$, O, SO$_2$,

or a bond; where R" can contain pendent ethynyl groups.

The corresponding lower alkyl diester of Formula II can be employed and is shown as Formula III below:

Formula III

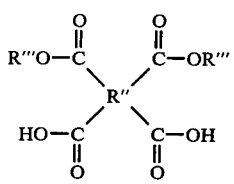

where R" is as defined and R"' is a lower alkyl group having from 1 to 4 carbon atoms such as methyl, ethyl, propyl or butyl and is preferably ethyl.

Examples of suitable compounds coming within the purview of Formulas II and III which can be employed include, but are not limited to:

Formula II Compounds 3,3',4,4'benzophenonetetracarboxylic dianhydride;
Pyromellitic dianhydride;

Bis(3,4-dicarboxyphenyl)methane dianhydride;
Bis(3,4-dicarboxyphenyl)ether dianhydride;
Bis(3,4-dicarboxyphenyl)sulfone dianhydride;
2,2-Bis(3,4-dicarboxyphenyl)hexafluoropropane dianhydride.

Formula III Compounds 3,3'-dicarbomethoxy-4,4'benzophenonedicarboxylic acid;
3,4'-dicarbomethoxy-3'4 benzophenonedicarboxylic acid;
4,4'-dicarbomethoxy-3'3"benzophenonedicarboxylic acid;
3,3'-dicarboethoxy-4,4'benzophenonedicarboxylic acid;
3,4'-dicarbopropoxy-3',4 benzophenonedicarboxylic acid;
2,5-dicarbomethoxy terephthalic acid;
3,5-dicarbomethoxy isophthalic acid;
2,5-dicarboethoxy terephthalic acid;
3,5-dicarboethoxy isophthalic acid;
2,5-dicarbopropoxy terephthalic acid;
3,5-dicarbopropoxy isophthalic acid;
2,5-dicarbobutoxy terephthalic acid;
3,5-dicarbobutoxy isophthalic acid;
3,3'-dicarbomethoxy-4,4'dicarboxydiphenylether;
3,4'-dicarbomethoxy-3',4-dicarboxydiphenylether;
4,4'-dicarbomethoxy-3,3'-dicarboxydiphenylether;
3,3'-dicarboethoxy-4,4'-dicarboxydiphenylether;
3,3'-dicarbopropoxy-4,4'-dicarboxydiphenylether
3,4'-dicarbobutoxy-3'4-dicarboxydiphenylether;
3,3'-dicarbomethoxy-4,4'-dicarboxydiphenylsulfone;
3,4'-dicarbomethoxy-3'4-dicarboxydiphenylsulfone;
4,4'-dicarbomethoxy-3,3'-dicarboxydiphenylsulfone;
3,3'-dicarboethoxy-4,4'-dicarboxydiphenylsulfone;
3,3'-dicarbopropoxy-4,4'-dicarboxydiphenylsulfone;
3,3'-dicarbobutoxy-4,4'-dicarboxydiphenylsulfone;
3,3'-dicarbomethoxy-4,4'-dicarboxydiphenylmethane;
3,4'-dicarbomethoxy-3'4-dicarboxydiphenylmethane;
4,4'-dicarbomethoxy-3,3'dicarboxydiphenylmethane;
3,3'-dicarboethoxy-4,4'-dicarboxydiphenylmethane;
3,3'-dicarbopropoxy-4,4'-dicarboxydiphenylmethane;
3,3'-dicarbobutoxy-4,4'-dicarboxydiphenylmethane;
2,2-Bis(3-carbomethoxy-4-carboxyphenyl)hexafluoropropane;
2-(3-carbomethoxy-4-carboxyphenyl)-2(3'-carboxy-4-carbomethoxyphenyl)hexafluoropropane;
2,2-Bis(3-carboxy-4-carboxymethoxyphenyl)hexafluoropropane.

The aromatic diamine to be reacted with the aromatic tetracarboxylic acid preferably has the formula:

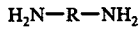  Formula IV where R is poly(arylene ether), diarylene ketone, diarylene methane, diarylene sulfone, poly(arylene thioether) or an acetylene-substituted derivative thereof.

In order to increase the tractability and solubility of the acetylene-substituted products of this invention, R will preferably contain two or more ether or thioether linkages between arylene radicals and/or pendent aryl substituents on an aryl ether radical. Compounds of particular interest are those in which R corresponds to the following:

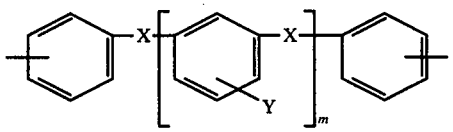
Formula V wherein X is O or S, Y is H or C≡CH, m is a value from 0 to about 4, and the amino groups of Formula IV are meta or para to the ether or thioether linkages.

Norman Bilow et al in Column 2, line 67, of their U.S. Pat. No. 3,845,018 refer to their copending application Ser. No. 347,502 filed on Apr. 3, 1973 for a description of a procedure useful in preparing diamino substituted compounds corresponding to Formula V when Y is equal to C≡CH ortho to an ether linkage. A modification of that procedure is used to substitute the C≡CH meta to an ether linkage. In the modified procedure, the reaction may be exemplified by the following:

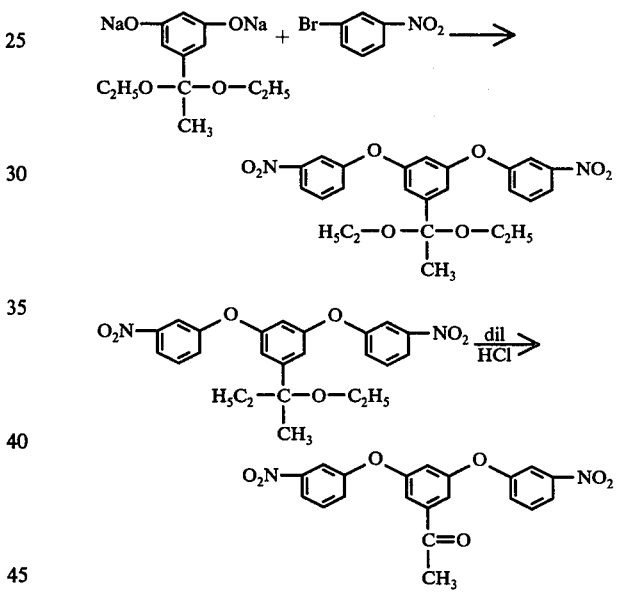

Once the acetyl product is obtained, subsequent conversion to the diamino acetylenic substituted compound is achieved through the corresponding steps of the procedure in Ser. No. 347,502.

In compounds where m is 2 or more, the Y substituents may be the same or different. Compounds are preferred wherein the amino groups are in the meta positions because they have lower melting points and are more tractable and soluble than the corresponding para-substituted analogs. Representative compounds having pendant aryl groups are 3,3'-diamino-5-phenyl diphenyl ether, and 3,3'-diamino 5-phenoxy diphenyl ether. Other typical diamines include 1-(3-aminophenoxy)-3-(4-aminophenoxy)benzene; 1,3-bis (3-aminophenoxy)-benzene; and 1-(4-aminophenoxy)-3-(4-aminophenoxy) benzene. Particularly good results have been obtained with 1,3-bis(3-aminophenoxy)benzene in producing acetylene-substituted polyimides which have good solubility and tractability.

Utilizing a dianhydride having Formula II above and the diamine having Formula IV, for illustration, the reaction proceeds to form an amic acid oligomer according to the following equation:

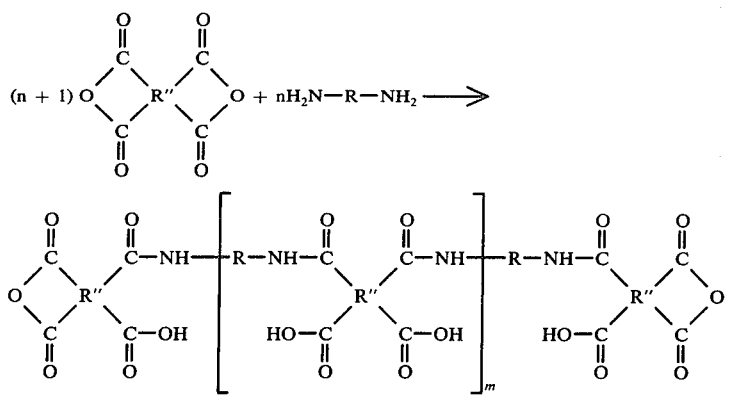

wherein n is one or greater, usually 1 to 15, and m is zero or greater.

The reaction of the aromatic tetracarboxylic acid, corresponding dianhydride or lower alkyl diester thereof with the aromatic diamine occurs at temperatures from 40° to 180° C., preferably 70° to 160° C.; reaction pressures of about atmospheric, but higher pressures on the order of 1000 psig (6.9 MPa) can be employed if desired; and the reaction time is on the order of 10 to 300 minutes, more usually on the order of 30 to 150 minutes. Since both of the reactants tend to be solids, it is desirable to operate the process in the presence of a solvent, and in accordance with the subject invention, the solvent is NMP. A sufficient amount of the solvent is employed to form a solution of the reactant at elevated temperatures where reaction occurs, that is, temperatures on the order of 70° to 160° C.

The anhydride-capped polyamic acid oligomers, or the corresponding ester-capped analogs, are then reacted with a compound having the formula:

Formula VI

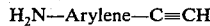

H₂N—Arylene—C≡CH wherein arylene is phenylene, naphthylene, or biphenylene. It is preferred to use m-aminophenylacetylene, 3-amino-3'ethynylbiphenyl, 4-amino-3'-ethynylbiphenyl, or 3-amino-4'-ethynyldiphenyl ether and the 3,3' and 4,4' substituted analogs thereof because the meta substitutions provide oligomers with lower melting points, better solubility, and better melt flow properties. The anhydride-capped polyamic acid oligomer and an aminoarylacetylene compound are reacted in the presence of the NMP to produce an acetylene-terminated polyamic acid oligomer. The reaction occurs at elevated temperatures from about 40° to about 180° C., preferably at temperatures from 70° to 160° C. The reaction pressure is again about atmospheric, but higher pressures can be used if desired. The reaction time is on the order of one to 16 hours, more usually about 2 to 12 hours. The aminoarylacetylenes represented by Formula VI above are known in the art and their preparation is described in Column 4, lines 41 et seq., of the Bilow et al U.S. Pat. No. 3,845,018, and the description in the Bilow et al patent is incorporated herein by reference. For example, Bilow et al teach that an aromatic compound having both nitro and acetyl substituents is reacted, preferably under reflux, with dimethylformamide and phosphorus oxychloride to covert the acetyl radical to —C(Cl)=CHCHO. The reaction is exothermic, and external cooling is needed to keep it at approximately room temperature. The β-chloro-substituted aldehyde radical is converted to —C≡CH by refluxing a solution of the compound in dioxane and sodium hydroxide. The product is extracted with an organic solvent such as ether; the organic solution is dried; the solvent is removed; and the product recovered by vacuum distillation. The nitro group is then converted to amino by refluxing an aqueous alcohol solution of the product with at least 6 moles of ferrous sulfate per mole of nitro compound. The product is removed by solvent extraction, e.g. ether, and purified, e.g. by vacuum distillation. According to Bilow et al, the process is described in more detail in the same application Ser. No. 347,502 referred to above.

The product is a solution of an acetylene-terminated polyamic acid oligomer for the corresponding anhydride or ester analog depending on whether an acid anhydride or ester starting material was employed. This material represents a polyimide precursor in Formula VII below:

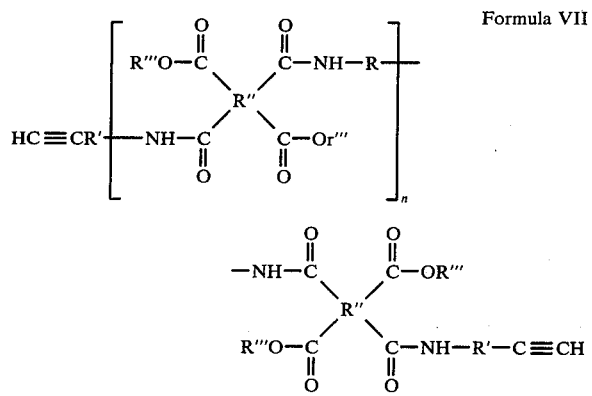

Formula VII wherein R, R', R" and n are defined above, and R''' is H or lower alkyl, such as methyl, propyl, butyl and preferably ethyl. R" and R may also contain pendent ethynyl groups.

To obtain the desired acetylene-substituted polyimide oligomers, it is now necessary to remove water if an aromatic tetracarboxylic dianhydride was employed, or to remove an alcohol if a lower alkyl diester of an aromatic tetracarboxylic acid was employed. Normally the imidization reaction occurs thermally, although a catalyst can be added if desired, and it is preferred to add an imidization agent to aid in the azeotropic removal of water and/or an alcohol.

In Column 4, lines 31 et seq., Bilow et al teach in their U.S. Pat. No. 3,845,018 referred to above that the dimethyl formamide solvent employed by Bilow et al is removed initially, and the polyamic acid is diluted with an imidization agent such as acetic anhydride or a benzene-cresol mixture. It is not clear why Bilow et al find it necessary to remove the dimethyl formamide solvent, but it has been found as will be noticed below in the working Examples that even when the dimethyl formamide solvent is "removed" at this point, it is not fully removed, and portions of the dimethyl formamide appear to be chemically complexing or reacting and are evolved at higher post-cure temperatures resulting in fracturing of the products after curing.

It may be desirable to remove a portion of the NMP solvent before the imidization reaction takes place, but this is simply a matter of convenience to the operator. The addition of an imidization agent is also optional and simply serves its normal engineering function to aid in the removal of byproduct water or alcohol. Any well-known imidization agent can be employed such as benzene. It is preferred, of course, that the imidization occur thermally, and the temperature at which imidization occurs is the reflux temperature necessary for the removal of the water and/or alcohol. The imidization reaction can, as is well known, be operated under higher temperatures if pressure operation is employed, but atmospheric operation is satisfactory. It is also possible to remove the NMP before imidization and replace it with another solvent, but there is no advantage to doing this; in fact, there is a definite disadvantage in having to maintain separate stores of different solvents.

The acetylene-substituted polyimides made by the process of this invention are recovered by any suitable technique. For example, the NMP can be removed in a rotary evaporator followed by washing with absolute ethanol. A preferred technique is to precipitate the polyimide oligomer by contacting a solution of the oligomer in NMP with an alcohol such as absolute ethanol followed by several washes with absolute ethanol. The product is recovered by filtration or centrifugation and finally dried in an oven at 120° C. under vacuum for 24 hours or longer.

The acetylene-substituted polyimides may be used neat to form molded articles, or the polyimide oligomers can be used to form laminates using, for example, a glass cloth, or the polyimide oligomers can be used to form composites containing additives such as powdered metals. The polyimide oligomers are converted to a solid infusible product, e.g. molded article, by curing at elevated temperatures of up to 485° F. (252° C.) for time periods of 0.25 to 48 hours. The resulting laminates or composites have excellent physical properties, as noted by Bilow et al in their U.S. Pat. No. 3,845,018. The properties of the product are improved by post-curing at temperatures above 485° F. (252° C.) and usually temperatures from 500° to 700° F. (260° to 371° C.). The post-curing time is normally from four to 48 hours.

The invention will be further described with reference to the following experimental work.

EXAMPLE 1

To a solution of 3,3',4,4'-benzophenonetetracarboxylic acid dianhydride (BTDA) (19.32 grams, 0.06 mole) in 165 ml of N-methyl-2-pyrrolidone heated at 150° C. was added dropwise over a 45-minute period a solution of 1,3-bis(3-aminophenoxy)benzene (8.76 grams, 0.03 mole) in 75 ml of NMP. The mixture was heated for 50 minutes at 150° to 154° C. and then a solution of 7.35 grams (0.063 mole) of 3-aminophenylacetylene in 15 ml of NMP was added all at once. A total of 32 ml of benzene was then added, and the reaction mixture was heated to 150° to 160° C. to reflux the benzene and remove the water of imidization as a water-benzene azeotrope into a Dean-Stark water trap. The total reaction time was ten hours. The total water removed was 3.5 ml; the benzene and NMP solvents were removed at 80° C. under vacuum on a rotary evaporator. The residue was washed with absolute ethanol using a Waring blender, filtered, and then the same washing procedure was repeated twice more. The residue was dried in a vacuum oven for 24 hours at 120° C. The product yield was 31.5 grams, or 94.6% of theoretical. The product had a melting point range of 190° to 196° C.

EXAMPLE 2

10.0 grams of a neat resin from Example 1 were molded into a disc having the dimensions 0.995 inches diameter × 0.575 inches thick (2.52 cm. dia. × 0.425 cm. thick) after pre-cure for 45 minutes at 350° F. (177° C.). The molding conditions were 485° F. (252° C.) for 16 hours at 2000 psi (13.8 MPa). The disc was post-cured in two stages, as follows:

Stage 1 - 18 hours at 600° F. (316° C.) at atmospheric pressure;
Stage 2 - 24 hours at 700° F. (371° C.) at atmospheric pressure.

The post-cured sample showed no blistering or delimination, and the weight loss during post-curing was 2.02 percent, and the void content of the final product was found to be 1.06 percent.

EXAMPLE 3

The procedure of Example 2 was repeated, but a 50—50 isopropanol-methanol wash liquid was used. A yield of 91.7 percent oligomer product was obtained. The weight loss during post-curing was 1.95%, and the void content of the final product was 1.19%.

EXAMPLE 4

Example 3 was repeated, but isopropanol wash liquid was used. The properties of the product were substantially the same as in Example 2, except the yield was 93.8 percent. The weight loss during post-curing was 1.89 percent, and the void content of the final product was 0.86 percent.

EXAMPLE 5

Example 2 was repeated, except acetone was used as the wash liquid. The properties of the final product were substantially the same as in Example 2 except the yield was reduced to 72.6 percent. The weight loss and void content were 3.89 and 2.19 percent, respectively.

EXAMPLE 6

Example 2 was repeated except the wash liquid was water. The properties of the final product were substantially the same as in Example 2, except the yield was 99.6 percent. The weight loss and void content were 2.93 and 1.3 percent, respectively.

EXAMPLE 7

To a solution of 55.1 grams (0.17 mole) of BTDA in dry dimethyl formamide (500 ml), heated at 150° to 153°

C., was added, drop-wise over a period of one hour, a room-temperature solution of 25.0 grams (0.0856 mole) of 1,3-bis(3-aminophenoxy)benzene in 250 ml of DMF. The mixture was heated at reflux for 2.0 hours, and then a solution of 3-aminophenyl acetylene (21.0 grams, 0.1795 mole) in DMF (100 ml) was added; and the solution was heated at reflux for an additional 4.0 hours after the addition. The DMF solvent was removed on a rotary evaporator, and the residue was dissolved in hot (100° C.) meta-cresol (500 ml), cooled, and 250 ml of benzene was added. The mixture was heated to total reflux after adding a Dean-Stark water trap. After 3.0 hours, 1.2 ml of water was removed from the trap. The benzene - meta-cresol mixture was removed on the rotary evaporator until the total volume was approximately 250 ml. The slurry was precipitated and washed with 1000 ml of absolute ethanol, filtered, and then the procedure repeated twice again with 600 ml of fresh ethanol using a Waring blender to insure good washing. The residue was dried in a vacuum oven for three hours at 120° C. The product yield was 77.9 grams (82 percent).

EXAMPLE 8

54.1 grams of a neat resin from Example 7 after pre-cure at 350° F. (177° C.) for 45 minutes was molded into a disc having the dimensions 2.239 inches diameter × 0.531 inches thick (5.686 cm. dia. × 1.349 cm. thick). The molding conditions were 2 hours at 485° F. (252° C.) and a pressure of 2000 psig (13.8 MPa). The molded product appeared to be of general good quality at this point. The molded product was post-cured using the following schedule:

(1) 450°–600° F. (232°–316° C.) at 12.5° F. per hour;
(2) 600° F. (316° C.) for 24 hours;
(3) 600°–700° F. (316°–371° C.) at 5° F. per hour;
(4) 700° F. (371° C.) for four hours; and
(5) allowed to cool at room temperature.

The void content was 4.2 percent, and the weight loss was 3.74 percent. The sample showed blistering, delamination and swelling. The sample was cut in half, and small delaminations were noted throughout the center. This indicated that volatile products or decomposition was taking place during the post-cure.

The neat resin from Example 2 above and Example 7 above were both examined using a pyrolysis-gas chromatographic-mass spectrometry procedure at 350° F. (177° C.) pre-cure temperature; 485° F. (252° C.) (the molding temperature), and then at 700° F. (371° C.) (the maximum cure temperature). In each case the sample was heated to the indicated temperature in a stream of helium. The heated stream is then directed to a gas chromatograph which separates the components. The components are then identified in the mass spectrometer. The heating time at each temperature is four minutes. Residual DMF and meta-cresol were detected at 350° F. (177° C.) from the sample from Example 7, and NMP was noted from the resin from Example 2 at 350° F. (177° C.). No volatile products were noted at temperatures of 485° F. (252° C.) for the resin from either Example 2 or Example 7. However, at 700° F. (371° C.) DMF was again detected from the resin from Example 7, but no volatile products were noted when using the process of this invention, which is the resin from Example 2 above.

It appears that DMF, unlike NMP, is either chemically reacting with the oligomer or is forming a coordination compound which is stable to temperatures of above 485° F. (252° C.). The evolution of DMF was identified as the material which was causing the blistering and delamination of molded products in the 485° to 700° F. (252° to 371° C.) range. This is the temperature range required for post-curing for optimum high temperature stability.

Resort may be had to such variations and modifications as fall within the spirit of the invention and the scope of the appended claims.

I claim:

1. A process for the preparation of an acetylene-substituted polyimide oligomer which comprises
reacting a stoichiometric excess of a dianhydride of an aromatic tetracarboxylic acid, or a lower alkyl diester of said aromatic tetracarboxylic acid, with an aromatic diamine to form an anhydride-capped polyamic acid or acid-ester-capped analog in the presence of at least a sufficient amount of a solvent consisting essentially of N-methyl-2-pyrrolidone to form a solution at elevated temperatures;
thereafter reacting said anhydride-capped polyamic acid or analog with an aminoarylacetylene compound in the presence of said solvent to produce an acetylene-terminated polyamic acid oligomer;
converting said acetylene-terminated polyamic acid oligomer to the corresponding polyimide in the continued presence of at least a portion of said solvent;
and thereafter recovering the desired acetylene-substituted polyimide oligomers substantially free of said solvent.

2. A process in accordance with claim 1 wherein said acetylene-substituted polyimide oligomers are recovered at a temperature less than the minimum melting point of said polyimide oligomers.

3. A process in accordance with claim 2 wherein said acetylene-substituted polyimide oligomers are recovered at a temperature of less than 185° C.

4. A process in accordance with claim 3 wherein a tetracarboxylic acid anhydride is employed wherein the aromatic diamine is a polyarylene ether diamine, wherein the aminoarylacetylene is aminophenyl acetylene and wherein water is continuously removed during the conversion of said polyamic acid to said polyimide.

5. A process for the preparation of an acetylene-substituted polyimide oligomer having the following general structure:

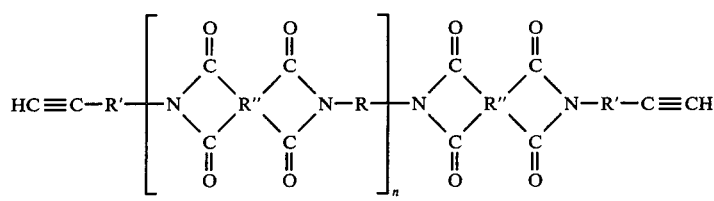

wherein R is poly(arylene ether) or poly(arylene thioether), R' is arylene or diarylene ether, n is an average from 1 to about 10, and R" is

[structure: benzene ring, or two benzene rings joined by X]

and X is C=O, CH$_2$, O, SO$_2$, $$-\overset{|}{\underset{|}{C}}(CF_3)_2$$

or a bond, which process comprises:
reacting a stoichiometric excess of
(i) an aromatic tetracarboxylic acid dianhydride having the formula:

[dianhydride structure with R"]

where R" is as defined above or:
(ii) a lower alkyl diester of an aromatic tetracarboxylic acid having the formula:

[diester structure: R'''O-C(=O), C(=O)-OR''', HO-C(=O), C(=O)-OH with R"]

where R" is as defined above and R''' is a lower alkyl group having from 1 to 4 carbon atoms;
with a compound having the formula:

H$_2$N — R — NH$_2$ where R is poly(arylene ether), diarylene ketone, diarylene methane, diarylene sulfone, poly(arylene thioether) or an acetylene-substituted derivative thereof;
in the presence of at least a sufficient amount of a solvent consisting essentially of N-methyl-2-pyrrolidone ("NMP") to form a solution at elevated temperatures to form an anhydride-capped polyamic acid or the acid-ester-capped analog;
thereafter reacting said anhydride-capped polyamic acid or analog in the continued presence of NMP with an aminoarylacetylene compound having the formula:

H$_2$N — R' — C ≡ CH where R' is phenylene, phenoxyphenylene, naphthylene, or biphenylene to produce an acetylene-substituted polyamic acid oligomer having the formula:

[oligomer structure with HC≡R'—NH—, R'''O—C(=O), C(=O)—NH—R, R", C(=O)—OR''', NH—C(=O), repeated n times, terminating with —NH—C(=O), C(=O)—OR''', R'''O—C(=O), C(=O)—NH—R'—C≡CH]

where R, R', R" and n are as defined above, and R''' is H or a lower alkyl having from one to four carbon atoms and R and R" may contain pendent ethynyl groups;
converting said acetylene-substituted polyamic acid oligomer to the corresponding polyimide in the continued presence of at least a portion of said solvent;
and thereafter recovering the desired acetylene-substituted polyimide oligomers substantially free of said solvent.

6. A process in accordance with claim 5 wherein said acetylene-substituted polyimide oligomers are recovered at a temperature less than the minimum melting point of said polyimide oligomers.

7. A process in accordance with claim 6 wherein said acetylene-substituted polyimide oligomers are recovered at a temperature of less than 185° C.

8. A process in accordance with claim 5 wherein water or an alcohol is continuously removed during the coversion of said polyamic acid to said polyimide.

9. A process in accordance with claim 5 wherein an aromatic tetracarboxylic acid dianhydride is employed having from one to two aromatic rings and wherein water is continuously removed during the conversion of said polyamic acid to said polyimide.

10. A process in accordance with claim 9 wherein an azeotroping agent is added to aid in the removal of the water of imidization.

11. A process in accordance with claim 10 wherein the azeotroping agent is benzene.

12. A process in accordance with claim 11 wherein the polyimide reaction product is treated to first remove the azeotroping agent and the solution of the polyimide in NMP is contacted with a sufficient amount of a non-solvent to result in precipitation of the polyimide in a filterable solid form.

13. A process in accordance with claim 12 wherein the non-solvent is selected from the group consisting of aliphatic alcohols having from one to four carbon atoms and water, or mixtures thereof.

14. A process in accordance with claim 13 wherein the non-solvent is absolute ethanol.

15. A process in accordance with claim 14 wherein said precipitated polyimide is recovered and dried at a temperature less than the minimum melting point of said polyimide.

16. A process in accordance with claim 5 wherein said aromatic tetracarboxylic dianhydride or lower alkyl diester has from one to two aromatic rings and wherein the diamine is a polyarylene ether and wherein the aminoarylacetylene has a single ring.

17. A process in accordance with claim 16 wherein the aromatic tetracarboxylic acid, corresponding dianhydride or lower alkyl diester has two rings and wherein no ring has more than two acid groups.

18. A process in accordance with claim 17 wherein the aromatic tetracarboxylic acid dianhydride is 3,3'-4,4'benzophenonetetracarboxylic acid dianhydride.

19. A process in accordance with claim 18 wherein the polyarylene ether is 1,3-bis(3-aminophenoxy)benzene.

20. A process in accordance with claim 19 wherein the aminophenylacetylene is 3-aminophenylacetylene.

21. A process for the preparation of acetylene-substituted polyimide oligomers which when cured as a laminate or a composite do not fracture on heating to temperatures in excess of 485° F. (252° C.) for extended periods of time, which comprises:

reacting a stoichiometric excess of an aromatic tetracarboxylic acid dianhydride or a lower alkyl diester thereof, with an aromatic diamine to form an anhydride-capped polyamic acid or the corresponding acid-ester-capped analog in the presence of at least a sufficient amount of a solvent consisting essentially of N-methyl-2-pyrrolidone to form a solution at elevated temperatures;

thereafter reacting said anhydride-capped polyamic acid or analog with an aminoarylacetylene compound in the presence of said solvent to produce an acetylene-terminated polyamic acid oligomer;

thermally converting said acetylene-terminated polyamic acid oligomer to the corresponding polyimide in the continued presence of said solvent;

thereafter recovering the desired acetylene-substituted polyimide oligomers substantially free of said solvent;

forming a molded article from the neat polyimide oligomers, a laminate or a composite from said recovered polyimide oligomers by curing at elevated temperatures of up to 485° F. (252° C.);

and post-curing said cured molded article, laminate or composite at a temperature in excess of 485° F. (252° C.).

22. A process in accordance with claim 21 wherein the post-curing temperature is from 485° to 700° F. (252° to 371° C.).

* * * * *